No. 743,918. Patented November 10, 1903.

UNITED STATES PATENT OFFICE.

FRED PAPE, OF NEW YORK, N. Y.

COMPOSITION FOR PREVENTING ADHESION OF PAPER TO RUBBER IN PRINTING-PRESSES.

SPECIFICATION forming part of Letters Patent No. 743,918, dated November 10, 1903.

Application filed February 28, 1903. Serial No. 145,557. (No specimens.)

*To all whom it may concern:*

Be it known that I, FRED PAPE, of New York, in the county of New York, and in the State of New York, have invented a certain new and useful Improvement in Compositions for Preventing Adhesion of Paper to Rubber in Printing-Presses; and I do hereby declare that the following is a full, clear, and exact description thereof.

In printing-presses where a rubber blanket, apron, or other rubber backing is used to force the paper into contact with the printing-surface and any other parts of the press where paper is brought into firm contact with a rubber surface paper frequently adheres to the rubber, probably owing to the generation of opposite electricities in the rubber and paper, and the speedy operation of the press is thus interfered with.

The object of my invention has been to provide a composition of matter which shall prevent the paper from thus adhering to the rubber parts of the press against which the paper is pressed or with which it comes in contact; and to such ends my invention consists in the composition for preventing adhesion of paper in printing-presses hereinafter specified.

In carrying my invention into practice I provide a composition consisting of lithographic-stone powder or other powdered stone, gelatin, glycerin, and means for causing such ingredients to adhere to the rubber blanket or apron, which means can conveniently be gum-arabic and fish-glue. The proportions I prefer to use are substantially as follows: lithographic-stone powder, ten ounces; gelatin, sixteen grains; glycerin, thirty-five drops; gum-arabic, six ounces; fish-glue, one gill.

The above-stated ingredients are mixed in about three ounces of hot water and well shaken together. The composition can then be applied to the rubber blanket or apron in any desired manner. For instance, in applying the composition to the rubber blanket of a lithographing printing-press the composition can be applied to the lithographing-stone, as with a sponge. The press is then caused to operate several times, and the solution is thus applied to the rubber blanket or apron. When the solution has been thus applied to the rubber blanket, a dry powder consisting of lithographic-stone powder is rubbed on the blanket with absorbent cotton until the blanket is dry. The blanket is then ready for use.

Instead of the above-stated method or procedure I can first bake the rubber apron or other rubber part to be treated, so that the pores of the rubber are open. The composition, either with or without the lithographic stone, is then spread on the blanket or apron. If the stone-powder is not in the solution already or if there be not sufficient stone-powder already on the apron, stone-powder is rubbed on the apron, as with absorbent cotton, and pressure is then applied to close the pores. The composition is then securely embedded in the apron, and its effect is retained for a long time. By the use of my composition the adhesion of the paper to the rubber blankets or aprons is avoided and the speed at which the press can be operated is materially increased.

It is obvious that various elements could be substituted for those above stated without materially changing the result.

Having thus described my invention, what I claim is—

1. A composition to prevent adhesion of paper to rubber in printing-presses, which composition comprises lithographic-stone powder.

2. A composition to prevent adhesion of paper to rubber in printing-presses, which composition comprises gelatin.

3. A composition to prevent adhesion of paper to rubber in printing-presses, which composition comprises lithographic-stone powder, gelatin and glycerin.

4. A composition to prevent adhesion of paper to rubber in printing-presses, which composition comprises lithographic-stone powder, gelatin and glycerin, and means to cause the before-mentioned ingredients to adhere to the rubber.

5. A composition to prevent adhesion of paper to rubber in printing-presses, which composition comprises lithographic-stone powder, gelatin, and glycerin, and means to cause the before-mentioned ingredients to adhere to the rubber, such means consisting of gum-arabic and fish-glue.

6. A composition to prevent adhesion of paper to rubber in printing-presses, which composition comprises lithographic stone and an adhesive substance.

7. A composition to prevent adhesion of paper to rubber in printing-presses, which composition comprises lithographic-stone powder and gelatin.

In testimony that I claim the foregoing I have hereunto set my hand.

FRED PAPE.

Witnesses:
 JOHN D. FEARHAKE,
 FRANK B. PIERCE.